INVENTOR
JOACHIM MAHLE

BY
Stephens, Huettig + O'Connell
ATTORNEYS

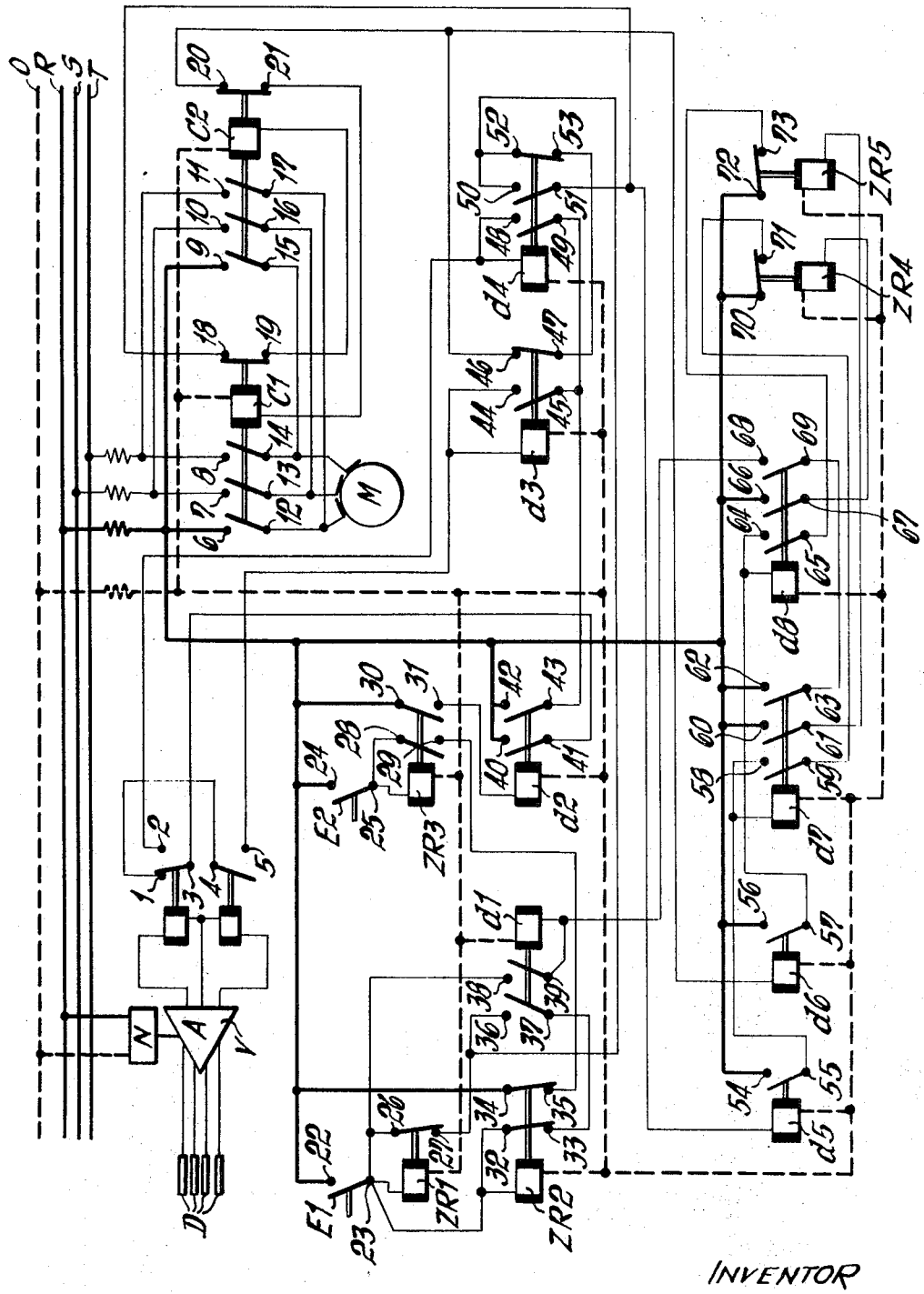

United States Patent Office 3,534,442
Patented Oct. 20, 1970

3,534,442
APPARATUS FOR CONTROLLING THE CLOSING
PRESSURE IN A PRESSURE MOLDING MACHINE
Joachim Mahle, Stuttgart-Bad Cannstatt, Germany, assignor to Firma Mahle-Werk GmbH, Fellbach, Germany
Filed July 5, 1968, Ser. No. 742,947
Claims priority, application Germany, July 26, 1967,
M 74,924
Int. Cl. B29f 1/00
U.S. Cl. 18—30    5 Claims

ABSTRACT OF THE DISCLOSURE

Strain gauges are used to control the motor driving the drive shafts moving the toggle lever connected crosshead and pressure plate in a pressure molding machine. The gauges measure the stress and strain in the drive shafts.

---

This invention relates to an apparatus for controlling the closing pressure for a molding press in a pressure casting machine which has a crosshead which is joined by a toggle lever to a closing plate for the molding plate. The crosshead is engaged by rotatable drive shafts which absorb the closing pressure, these shafts being geared to nuts threaded on said shafts and which are driven by an electric motor.

In such mold presses, the adjusting apparatus is used in order to set or adapt the position of the crosshead to the distance the mold must be positioned and in order to adjust the desired closing pressure which, on one hand, should be sufficient in order to hold the two halves of the mold closed and to do this with safety and security against the disruptive forces of the casting material which is introduced into the mold under pressure but which, on the other hand, is not unnecessarily high because otherwise too much pressure will be put on the parts and the parts will be stressed beyond their capacity. However, the closing pressure adjusted at the beginning of the operation changes considerably in a manner that cannot be determined without experience because of various influences as especially the heat exchange of the casting mold and because the drive shafts also expand by being heated.

The object of this invention is to produce an apparatus which makes possible an automatic and subsequent adjustment of the crosshead in such a manner that the closing pressure variations which exist and which depend upon changes in length and other influencing effects can be limited to a minimum value.

In general, these objects are obtained by using electrical transmitters which respond to the closing pressure in order to measure the closing pressure actually present when the mold press is closed. Information is obtained regarding whether the electrical analogous values which are obtained deviate from predetermined upper and lower border values and which are, at first, stored and evaluated and read after the press is opened and then used for the control of the driving motor for the adjustable threaded nuts. The electrical transmitters can be, for example, stress-strain gauges joined to the shafts and whose ohmic resistance changes during shaft expansion. Since the shafts are elastically expanded in proportion to the closing force during closing of the mold and since the expansion is transferred to the stress-strain gauges joined to the shafts, the stress or tension on the strain gauge results in a usable analogous value for the closing pressure. Alternatively the pressure changes can be measured by piezoelectrical quartz elements which are positioned at a point subject to the closing pressure force.

Figure 1:
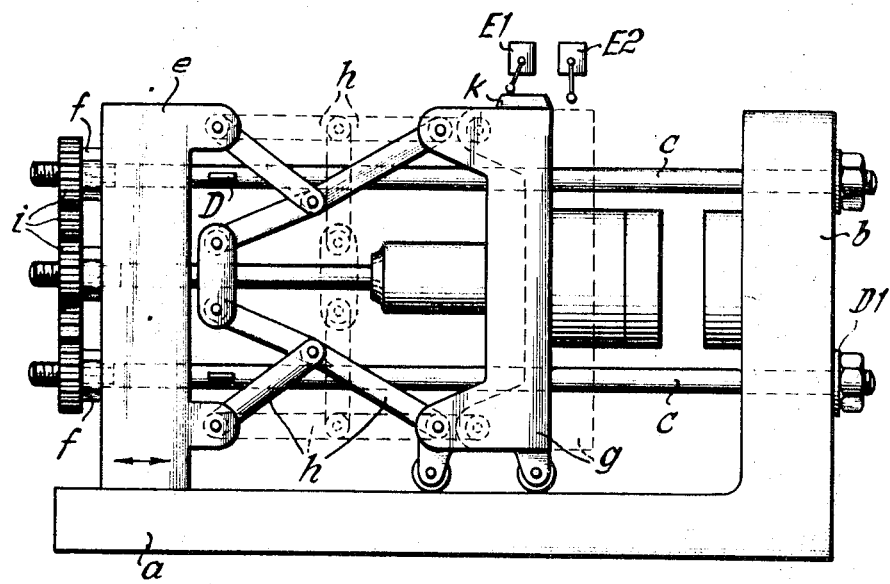
Figure 2:
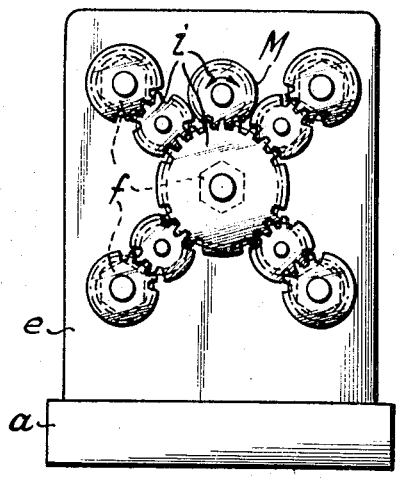

The means by which the objects of this invention are obtained are described more fully with reference to the accompanying drawings in which:

FIG. 1 is a front view of the press;
FIG. 2 is a side view of FIG. 1; and
FIG. 3 is a circuit diagram for the motor controlled circuit.

As shown in FIG. 1, the mold press is composed of a solid base $a$ with the right angle vertical stand $b$ in which the drive shafts $c$ are anchored. A movabe crosshead $e$ in positioned at a distance from the stand $b$ as determined by the nuts $f$. These nuts are threaded on the shafts $c$ which extend through crosshead $e$. Between the stand $b$ and the crosshead $e$ is a closing plate $g$ which is connected to the crosshead by toggle levers $h$. The crosshead and closing plate and toggle levers are shown in solid lines in their open press position. The dashed lines indicate the closed press position. The nuts $f$ are geared to pinions $i$ which are driven by electric motor M, FIG. 2.

Strain gauges D are joined to the shafts $c$ and which, during the closing of the mold, are subject to a tension stress and which elastically expand proportional to the rising closing pressure. Alternatively, quartz pressure gauges $D'$ can be used and which are positioned at a point which is under tension when the press is closed. As shown in FIG. 1, the closing plate $g$ carries a cam $k$ which actuates two switches E1 and E2 in such a manner that switch E1 is closed when the mold is open and E2 is closed when the mold is closed.

FIG. 3 shows the circuitry used for controlling the motor M.

The strain gauges D are joined to an electric voltage source by member N which connects to the network through a neutral conductor O and the phase R of an alternating current network R, S, T and are further connected through an amplifier V with a switch which contains two relays SR1 and SR2. These relays are arranged so that relay SR1 is actuated when the output voltage from amplifier V increases to a value which is larger than a voltage corresponding to the minimum permissible pressure. SR2 is actuated when the closing pressure is less than the smallest value which is still permissible and when a corresponding voltage occurs at the output of amplifier V. In the control mechanism are relay switches C1 and C2 of one each for the direction of motor rotation. Switches E1 and E2 which are actuated by the closing plate $g$, eight relays, $d1$ to $d8$, and five time delay relays numbered ZR1 to ZR5 are in the circuit. The switches control the contacts of relays numbered from 1 to 73. All the switches are shown in their inactive position. The heavy lines are connected to the phase R while, for purposes of clarity, the grounded lines connected to the neutral line O are shown in dashed lines.

E2 is actuated as the press is being closed and thus connects time relay ZR3 with the voltage source by way of switches 24 and 25. The time period is so adjusted that the relay is actuated only when the closing plate $g$ has reached the closing position. Then relay ZR3 places, through switches 30 and 31, the relay $d2$ in communication with the electric current and this relay, in turn, places the two switches which are actuated by relays SR1 and SR2 into communication with the current by way of switches 40, 41, 3, and 1, 4. ZR3 and thus also $d2$ are prevented from any voltage reduction by switches 35, 29, 28, and 25 for the time duration that time relay ZR2 remains inactive. Therefore, contacts 3 and 4 are in communications with the current for the same amount of time.

If the closing pressure has not then reached the predetermined minimum value, then neither relay SR1 nor relay SR2 are activated and the switches which are actuated by them remain in the positions as shown.

During the opening of the press, the switch E2 also opens while switch E1 closes and at the same time places relay ZR1 and relay ZR2 in communication with the current by way of switches 22 and 23. However, the communication from switch 26 to switch 27 remains closed until the time that has been adjusted by relay ZR1 has elapsed and therefore the switch relay C1 is connected with the current by way of switches 23, 26, 27, 52, 53, 47, 46, and 20, 21 and thus starts the motor M which rotates the nuts $f$ for a period of time that has been set by relay ZR1. Current flows to relay $d6$ at the same time that it is received by $d4$ and controls by the way of switches 56 and 57 the relay $d8$ which is held by relay ZR5 by switches 73 65, and 64 as long as it remains inactive and is used for that period of time as a storage for the direction of the motor rotation.

After the time that has been adjusted by relay ZR2 has elapsed, the automatic holding process of ZR3 is interrupted. Relays ZR3 and $d2$ are then reduced in voltage.

If the mold is closed at this time, then relay ZR1 and ZR2 are reduced in voltage also. Relay ZR3 is again placed in communication with voltage by the actuation of switch E1 and the entire process is repeated until the contacts 3 and 4 also again receive voltage.

If the closing pressure lies now between the minimum and maximum values, then relay SR2 is actuated and by way of contacts 4 and 5 places the relay $d3$ under voltage. This opens switches 46 and 47 by the reduction in voltage in the bridges of contact actuated by $d3$. Therefore, when the press is again opened, the described connection through 23, 26, 27, 52, 53, and 47 cannot be made by way of 46 and 20, 21. Thus no switch relay for the motor is actuated.

If, therefore, during the following closing process, the closing pressure lies above the minimum value, then SR1 and SR2 are activated and place, by way of contacts 4, 5 and/or 3, 2, the relays $d3$ and $d4$ under voltage which is then held through $d2$ by way of 42, 43, 45, 44, and/or 42, 43, 49, 48.

The switch relay C2 of the motor is now activated during the re-opening process by way of 23, 26, 27, 50, 51, and 18, 19 and, at the same time, the relay $d5$ is actuated. This means that $d7$ is under voltage by way of 54, 55 and thus is held through ZR4 by way of 70, 71, 59, and 58. Relay $d8$ is also reached according to the operating cycle which has been first described. Therefore, relay $d1$ now also communicates with the voltage by way of 62, 63, 69, and 68 and thus couples ZR1 parallel to ZR2. Since the period of time adjusted at ZR2 is larger by that span of time which is required for quieting the play in the motor drives occurring during the reversal of the motor, this results in that the motor relay C2 remains active for a correspondingly longer period of time. Relay $d8$ is reduced in voltage after the time period adjusted by ZR5 has elapsed and there thus remains stored in the relay $d7$ only the direction of rotation which corresponds to the loosening of the nuts $f$.

Of course, the relays $d5$ to $d8$ and the time relays 4 and 5 can be omitted if one is willing to forego any consideration of the play in the drive shafts and gears which becomes noticeable during the reversing of the motor. The time relay ZR2 and the relay $d1$ can also be omitted from the electrical circuit which is controlled by the switch E1.

Having now described the means by which the objects of this invention are obtained, I claim:

1. Apparatus for controlling the closing pressure for a molding press in a pressure casting machine comprising a crosshead, a closing plate for holding a molding plate, toggle means movably joining said closing plate to said crosshead, rotatable drive shaft means engageable with said crosshead for absorbing the closing pressure, nut means threaded to said shaft means, motor driven gear means engaged to said nut means for rotating said drive shaft means, and electrical transmitter means actuatable by said shaft means for producing electric signals when said shaft means is stressed, for storing the electrical signals and any information derived from electrical analogous values when the closing pressure deviates from predetermined upper and lower border pressure values, and for applying said information to operate said motor driven gear means as adjusted after the pressure casting machine is opened.

2. Apparatus as in claim 1, said electrical transmitter means comprising strain gauges secured to said shaft means.

3. Apparatus as in claim 1, said electrical transmitter means comprising piezoelectrical quartz elements subject to the pressure of said shaft means.

4. Apparatus as in claim 1, said electrical transmitter means further comprising two relay means (SR1, SR2) coupled in parallel, amplifier means joined to said relay means for measuring the relay values and responding to voltages which are analogous to the closing pressures which are above or below permissible pressures and then first storing information corresponding to the responsive or nonresponsive action of said relay means (E1), and secondly (E2) applying said information during a time delay to said motor driven gear means (C1, C2).

5. Apparatus as in claim 4, further comprising storage means connected to said motor driven gears means for delaying the reversing drive of said motor driven gear means over a time corresponding to that required to overcome the plan in said motor driven gear means.

References Cited

UNITED STATES PATENTS 2,484,344 10/1949 Hiller et al.
2,917,773 12/1959 Burke.

H. A. KILBY, JR., Primary Examiner